(12) United States Patent
Genderjahn et al.

(10) Patent No.: US 9,951,843 B2
(45) Date of Patent: Apr. 24, 2018

(54) HYDRAULIC BEARING AND MOTOR VEHICLE WITH SUCH A HYDRAULIC BEARING

(71) Applicant: ContiTech Vibration Control GmbH, Hannover (DE)

(72) Inventors: Robert Genderjahn, Hannover (DE); Max Werhahn, Hannover (DE); Peter Marienfeld, Marklohe (DE)

(73) Assignee: ContiTech Vibration Control GmbH, Hannover (DE)

( * ) Notice: Subject to any disclaimer, the term of this patent is extended or adjusted under 35 U.S.C. 154(b) by 0 days.

(21) Appl. No.: 15/319,380

(22) PCT Filed: Apr. 9, 2015

(86) PCT No.: PCT/EP2015/057659
§ 371 (c)(1),
(2) Date: Dec. 16, 2016

(87) PCT Pub. No.: WO2015/197215
PCT Pub. Date: Dec. 30, 2015

(65) Prior Publication Data
US 2017/0130801 A1 May 11, 2017

(30) Foreign Application Priority Data

Jun. 23, 2014 (DE) .......................... 10 2014 211 955

(51) Int. Cl.
*F16F 13/30* (2006.01)
*F16F 13/08* (2006.01)

(52) U.S. Cl.
CPC ............ *F16F 13/30* (2013.01); *F16F 13/085* (2013.01)

(58) Field of Classification Search
CPC .. F16F 13/04; F16F 13/06; F16F 13/08; F16F 13/085; F16F 13/30; F16F 13/305
(Continued)

(56) References Cited

U.S. PATENT DOCUMENTS

| 5,297,781 A | 3/1994 | Gennesseaux |
| 6,105,943 A | 8/2000 | Nagasawa |

(Continued)

FOREIGN PATENT DOCUMENTS

| DE | 10 2012 008497 A1 | 10/2013 |
| JP | 2011030411 A | 2/2011 |

*Primary Examiner* — John D Walters
(74) *Attorney, Agent, or Firm* — David L. Cate

(57) ABSTRACT

The invention relates to a hydraulic bearing (2) with a support spring (36), a working chamber (4) which is at least partly surrounded by the support spring (36) and which is filled with a hydraulic fluid, a control membrane (12) which is designed to change a working chamber volume of the working chamber (4), and an electromagnetic actuator (16) for deflecting the control membrane (12), wherein the actuator (16) comprises a stator (18) and an armature (20) which can be moved in the longitudinal direction L of the stator (18); the armature (20) is mechanically connected to the control membrane (12); the stator (18) has a stator conductive element (26) made of a ferromagnetic material; the stator conductive element (26) has an upper stator collar (32) which extends in the transverse direction Q of the stator (18) and a lower stator collar (28) which extends in the transverse direction Q of the stator (18); the armature (20) has an armature conductive element (72) made of a ferromagnetic material; the armature conductive element (72) has an upper armature collar (58) which extends in the transverse direction Q of the stator (18) and a lower armature collar (54) which extends in the transverse direction Q of the stator (18); the upper stator collar (32) and the upper armature collar (58) face each other; and the lower stator collar (28)

(Continued)

Figure 1:
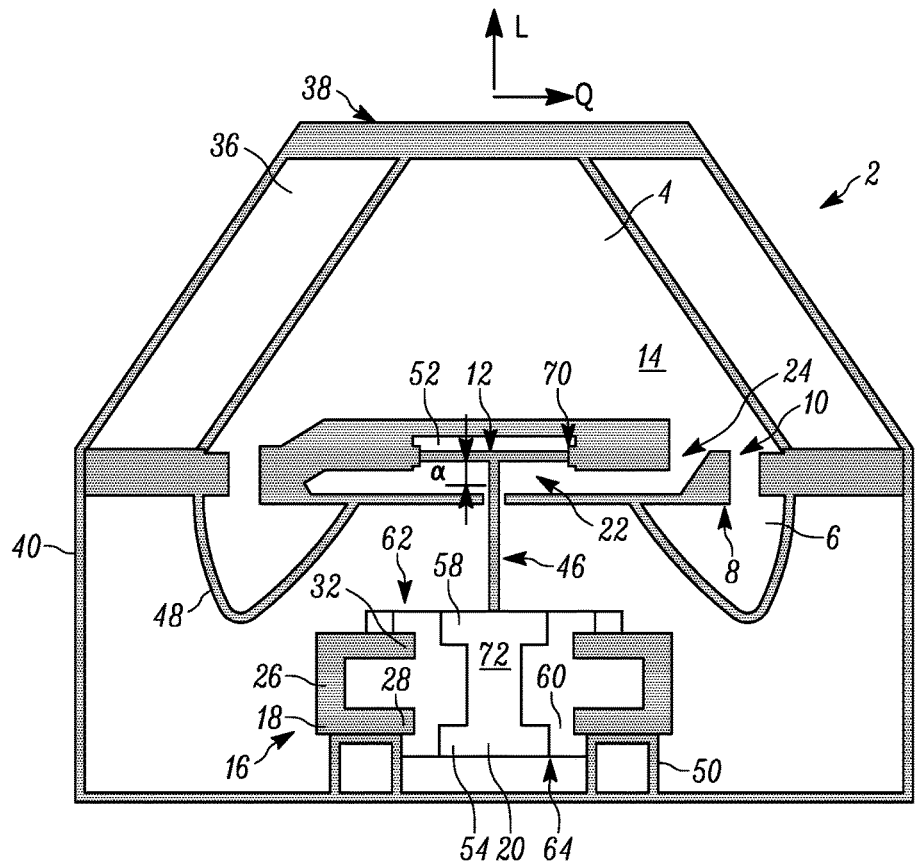

and the lower armature collar (54) face each other. The control membrane (12) is designed for a maximum deflection a in the deflection direction of the control membrane, and the mutually facing upper and/or lower collars (32, 58 or 28, partly overlap over an overlap length u in the longitudinal direction L of the stator (18) such that a ratio of the overlap length u to the maximum deflection a lies between 0.1 and 1.5. The invention further relates to a motor vehicle with a corresponding hydraulic bearing (2).

11 Claims, 1 Drawing Sheet

(58) Field of Classification Search
USPC .......................................... 180/300, 165, 2.1
See application file for complete search history.

(56) References Cited

U.S. PATENT DOCUMENTS

| | | | |
|---|---|---|---|
| 6,361,031 B1* | 3/2002 | Shores | F16F 13/18 |
| | | | 267/140.14 |
| 6,476,702 B1 | 11/2002 | Hartwig et al. | |
| 6,565,072 B2* | 5/2003 | Goto et al. | F16F 7/1011 |
| | | | 267/140.14 |
| 6,588,737 B2 | 7/2003 | Goto et al. | |
| 7,036,804 B2* | 5/2006 | Bodie | F16F 13/20 |
| | | | 267/140.14 |
| 9,033,319 B2* | 5/2015 | Kim | F16F 13/08 |
| | | | 267/140.14 |
| 2002/0036372 A1 | 3/2002 | Goto | |
| 2006/0001204 A1 | 1/2006 | Kato | |
| 2009/0079118 A1 | 3/2009 | Muraoka | |
| 2013/0234539 A1 | 9/2013 | Genderjahn et al. | |
| 2013/0256960 A1 | 10/2013 | Marienfeld et al. | |
| 2014/0161650 A1 | 6/2014 | Paweletz | |

* cited by examiner

HYDRAULIC BEARING AND MOTOR VEHICLE WITH SUCH A HYDRAULIC BEARING

The invention relates to a hydraulic mount, having a load-bearing spring, a working chamber which is at least partially enclosed by the load-bearing spring and which is filled with a hydraulic fluid, a control diaphragm which is designed for the variation of a working chamber volume of the working chamber, and an electromagnetic actuator for the deflection of the control diaphragm, wherein the actuator comprises a stator and an armature which is movable in the longitudinal direction of the stator, the armature is mechanically connected to the control diaphragm, the stator has a stator conductive element composed of ferromagnetic material, the stator conductive element has an upper stator collar extending in the transverse direction of the stator and has a lower stator collar extending in the transverse direction of the stator, the armature has an armature conductive element composed of ferromagnetic material, the armature conductive element has an upper armature collar extending in the transverse direction of the stator and has a lower armature collar extending in the transverse direction of the stator, the upper stator collar and the upper armature collar face toward one another, and the lower stator collar and the lower armature collar face toward one another.

The invention furthermore relates to a motor vehicle which comprises a vehicle frame, an engine and an engine mount in the form of a hydraulic mount, which engine mount produces a connection, with mounting action, between the engine and the vehicle frame.

Hydraulic mounts, also referred to as hydraulic bearings, are known from the prior art. They serve for the elastic support of assemblies, in particular of motor vehicle engines. By way of such hydraulic mounts situated for example between an engine and a chassis of a motor vehicle, it is firstly sought to prevent engine vibrations from being transmitted to the chassis, and secondly, it is sought to achieve that the vibrations of the chassis that arise during driving operation cannot pass, or can pass only having been dampened, from the chassis to the engine. Here, consideration must be given to the known conflict in the field of vibration isolation which consists in the fact that the mount should firstly be as rigid as possible in order to be able to accommodate high loads or mount forces, and secondly must have a soft characteristic in order to isolate to the greatest possible extent vibrations that arise over as broad as possible a frequency range.

In their basic version, such hydraulic bearings normally have a rubber element as a load-bearing spring. The rubber element is often in the form of a hollow cone. The load-bearing spring can thus form a casing wall of the working chamber. On the upper, pointed end side of the hollow cone, there is provided an upper cover to which there is attached a connection element for the fastening of the engine. The connection element is normally a threaded bolt which can be screwed to the engine.

The hydraulic mount normally comprises at least two chambers, specifically the stated working chamber and an equalization chamber. In the longitudinal direction of the hydraulic mount, the equalization chamber is normally arranged below the working chamber. To separate the working chamber and the equalization chamber from one another, a partition may be arranged between the equalization chamber and the working chamber. Furthermore, a throttle duct formed between the working chamber and the equalization chamber may be provided for the exchange of hydraulic fluid. The throttle duct is preferably formed at least in sections by the partition. Alternatively, the throttle duct may also be formed separately from the partition. The hydraulic fluid in the working chamber, the equalization chamber and the throttle duct preferably forms the entire hydraulic volume of the hydraulic mount, unless further additional volumes are provided in special embodiments. As hydraulic fluid, use is preferably made of a mixture of oil and water or a fluid with glycol.

When the hydraulic mount is subjected to a load, a force acts on the load-bearing spring in the longitudinal direction of the hydraulic mount, such that said load-bearing spring elastically deforms. Said deformation is also referred to as compression of the load-bearing spring. In this context, it must be observed that the working chamber is at least partially enclosed or surrounded by the load-bearing spring. Therefore, the working chamber is reduced in size as a result of the compression of the load-bearing spring, whereby the pressure in the working chamber increases, such that the working chamber and the load-bearing spring can inflate in an outward direction, in particular toward the sides thereof. Furthermore, a deformation can take place at the partition and/or in the transition to the control diaphragm. This is because the partition and the control diaphragm, with their fastening elements for the attachment to the partition, have a finite stiffness. If the control diaphragm itself and the partition are each of particularly high stiffness, a corresponding overall stiffness may be dominated by the fastening elements. Said fastening elements are specifically often designed to permit a deflection of the control diaphragm. Thus, said fastening elements can also contribute to an inflation of the working chamber. The inflation of the working chamber may be characterized by the so-called inflation stiffness, which specifies a ratio of expansion to a force acting on the wall of the working chamber.

Alternatively or in addition, a part of the hydraulic fluid of the working chamber may flow through the throttle duct into the equalization chamber. The throttle duct is preferably designed so as to constitute a flow resistance for the flowing hydraulic fluid. The flow through the correspondingly formed throttle duct thus generates dissipation and therefore damping work. The equalization chamber is preferably equipped with at least one wall part which is deformable in the manner of a diaphragm, such that the part of the hydraulic fluid which flows into the equalization chamber can be accommodated.

A hydraulic mount of said type is known for example from the document DE 10 2010 060 886 A1 or from the document DE 10 2012 008 497 A1.

The damping characteristics of such hydraulic mounts are frequency-dependent owing to their type of construction. Steady-state or quasi-steady-state loads below a frequency of 5 Hz are in this case normally accommodated by the load-bearing spring, which exhibits relatively high stiffness.

Low-frequency vibrations, that is to say vibrations with frequencies of approximately 5 to 20 Hz, which generally occur with large amplitudes, are intensely dampened by way of the interaction of the two hydraulic chambers via the throttle duct. Here, the damping arises with the discussed flow of at least a part of the hydraulic fluid of the working chamber through the throttle duct into the equalization chamber and vice versa, with corresponding damping work being performed. A particularly high level of damping is achieved if the inflation stiffness is adequately high. This is because, in this case, the working chamber is not inflated to too great an extent, such that at least a part of the hydraulic fluid flows through the throttle duct in order to then realize the desired damping action. Otherwise, a situation could arise in which the working chamber inflates to a great extent without a significant part of the hydraulic fluid flowing through the throttle duct. This would have the disadvantage that the corresponding damping action would be very low. This must however be avoided.

High-frequency vibrations, that is to say vibrations in the frequency range above 20 Hz to for example 50 Hz, 100 Hz or 200 Hz, are transmitted with only very little damping, or even virtually without damping, owing to the inertia, viscosity and incompressibility of the hydraulic fluid and/or the high stiffness and inertia of the load-bearing spring. Although said vibrations generally only occur with small amplitudes, they are of relatively high importance owing to their acoustic action.

With regard to isolation of such vibrations, use is nowadays made of so-called actively controlled hydraulic mounts which have in each case a linear actuator, also referred to as linear actuating means. Electromagnetic linear actuators which have in each case one stator and one armature have proven to be particularly expedient. Here, the armature is formed so as to be mounted movably with respect to the stator, such that the armature can be deflected relative to the stator in the longitudinal direction of the linear actuator or stator. For the hydraulic mount, the armature is mechanically connected to a control diaphragm, which is preferably assigned to a face-side wall of the working chamber, wherein said wall is preferably the partition. The control diaphragm may be formed by a flexible part of the partition. It is however also possible for the control diaphragm to be enclosed by the partition and to thus be regarded as a constituent part of the partition. The control diaphragm can be displaced or elastically deformed in its deflection direction, which is often its normal direction. By virtue of the armature being mechanically coupled to the control diaphragm, it is possible by way of the electromagnetic linear actuator for the control diaphragm to be deflected in controlled fashion in its deflection direction. Here, it may be provided that the armature is not connected directly to the control diaphragm, with a joint mechanism and/or an armature plunger, for example, rather being provided which are arranged between the armature and the control diaphragm in order to transmit movements and/or forces from the armature to the control diaphragm. The joint mechanism and/or the armature plunger may thus be assigned to the armature. With the deformation of the control diaphragm in its deflection direction, the hydraulic volume of the working chamber thus changes. The electromagnetic linear actuator of the hydraulic mount thus also serves for controlling or varying the working chamber volume of the working chamber.

A force exerted on the control diaphragm by the armature is in this case effected by way of an electromagnetic interaction between the armature and the stator. For this purpose, the stator has a stator conductive element composed of ferromagnetic material. An upper stator collar and a lower stator collar extend in the transverse direction of the stator, which collars are preferably spaced apart from one another in the longitudinal direction of the stator. The stator conductive element is thus preferably of C-shaped or comb-shaped form in cross section. Said stator conductive element is thus suitable for engaging over a permanent magnet and/or an electrical coil. To close the respective ends, formed by the upper stator collar and the lower stator collar, of the stator conductive element for a magnetic field, the armature has an armature conductive element composed of ferromagnetic material. The armature conductive element has an upper armature collar and a lower armature collar, which extend in each case in the transverse direction of the stator and which are preferably spaced apart from one another in the longitudinal direction of the stator. The armature conductive element is thus preferably of C-shaped or comb-shaped form in cross section. Said armature conductive element is thus suitable for engaging over a permanent magnet and/or an electrical coil. To now close the ends of the stator conductive element for a magnetic field, the upper stator collar and the upper armature collar face toward one another. Furthermore, the lower stator collar and the lower armature collar face toward one another. Since the armature can move in the longitudinal direction with respect to the stator, the abovementioned statements are to be considered for a starting operating point of the actuator.

The conductive elements serve for concentrating, conducting and/or diverting a magnetic field. A magnetic field of said type may be effected by way of a permanent magnet and/or a coil. The coil is to be understood to mean an electromagnetic coil having at least one, preferably multiple windings. The at least one coil or the at least one permanent magnet may be engaged over by the armature conductive element and/or by the stator conductive element. It is particularly preferably the case that the armature conductive element engages, by way of the associated armature collar, over a permanent magnet, and the stator conductive element engages, by way of the associated stator collar, over a coil. For the further explanation, it is to be assumed by way of example that a permanent magnetic field of the at least one permanent magnet extends through the upper and the lower armature collar. For this purpose, the permanent magnetic field points in the same direction in the upper and in the lower armature collar, preferably in the direction of the stator, or vice versa. If a coil magnetic field is generated by the at least one coil, said coil magnetic field extends through the stator conductive element and is concentrated by the latter.

In the event of an energization of the at least one coil of the stator, the armature is then pulled in the longitudinal direction of the stator. The pulling movement of the armature can be attributed to a constructive superposition of the coil magnetic field generated by the at least one coil and of the permanent magnetic field in the upper armature collar, and a destructive superposition of the coil magnetic field and of the permanent magnetic field in the lower armature collar. The constructive and destructive superposition may also be realized in a reversed configuration if the current flows for example in the opposite direction. In this case, not a pulling movement but rather an oppositely directed movement of the armature would occur.

The action of force can thus be attributed to the fact that the armature conductive element forms, in the longitudinal direction, a yoke composed of ferromagnetic material for the stator conductive element, and the coil magnetic field is attenuated at the upper armature collar and is amplified at the lower armature collar by the permanent magnetic field or vice versa. A corresponding effect may also be realized with multiple permanent magnets. For example, if a first and a second permanent magnet are provided, wherein the two permanent magnets are spaced apart from one another in the longitudinal direction, the two permanent magnets may each substantially be responsible for the constructive and destructive superposition, respectively, of the magnetic fields.

To ensure the mobility of the armature relative to the stator, it is preferable for an air gap to be provided between the stator and the armature. If the stator is of ring-shaped form and the armature is inserted into the cylindrical cavity of the ring-shaped stator, the air gap may likewise be of ring-shaped form.

Without energization of the at least one coil, only the at least one permanent magnet generates a permanent magnetic field, which acts on the conductive elements. Corresponding static magnetic field lines form. The permanent magnetic field of the at least one permanent magnet is preferably oriented in the transverse direction, that is to say in a direction transverse with respect to the longitudinal direction. If the coils are not energized, it is also the case that a static magnetic state of the actuator is realized, wherein the armature assumes a particular rest position.

If the hydraulic mount is used for the mounting of an engine of a motor vehicle, sensors of the motor vehicle may be used in order to transmit the vibrations emitted by the engine to an as far as possible only highly damped extent to an interior compartment, or to even completely decouple the vibrations of the engine. For this purpose, it is for example possible for a sensor to be provided which can measure vibrations of the engine or of the chassis. Alternatively, it is also possible for multiple sensors to be provided at various locations of the engine and/or of the chassis.

If high-frequency vibrations are detected by the sensor for measuring the vibrations of the chassis, the control diaphragm can be deflected synchronously by the linear actuator. Here, the direction of the deflection may be defined by the type of construction of the partition or of the control diaphragm. The vibrations of the engine give rise to correspondingly high-frequency pressure fluctuations in the hydraulic fluid of the working chamber. With the synchronous deflection of the control diaphragm, said high-frequency pressure fluctuations are as far as possible completely balanced. In the best case, compensation is thus realized, such that said high-frequency vibrations are not transmitted by the hydraulic mount. Correspondingly high-frequency vibrations thus do not give rise to vibration or noise emissions, or give rise to only very low vibration and noise emissions, in the interior compartment of the motor vehicle.

By way of the discussed actuation of the electromagnetic linear actuator and of the corresponding action on the control diaphragm, it is thus sought to realize a lowering of the dynamic spring rate of the hydraulic mount in the range of the high-frequency vibrations. In other words, it is sought to switch the hydraulic mount into a "soft" state for high-frequency vibrations.

For the compensation of inertia forces, structures are also known in which the control diaphragm is formed by a piston in a cylinder, and the piston is acted on at a rear side by the hydraulic fluid and at a front side by a compressed air volume. A hydraulic bearing of said type is disclosed for example in EP 0 561 703 A1, wherein the solution proposed here is characterized by a cumbersome and complex construction.

In practice, it has been found that an increase of the inflation stiffness leads to better damping of low-frequency vibrations. This can be attributed to the fact that, here, the working chamber inflates to a lesser extent, and thus a greater amount of the hydraulic fluid flows through the throttle duct if a pressure increase occurs in the working chamber. Thus, in the event of low-frequency vibrations, increased dissipation occurs, which ensures the improved damping. The inflation stiffness of the working chamber can be increased by virtue of a flexural stiffness of the control diaphragm, in particular of the associated connecting elements thereof for the connection to a wall, in particular to the partition, of the working chamber being increased. Alternatively or in addition, a stiffness of the armature in the longitudinal direction of the stator may be increased. This may be realized for example by way of stiffer bearing springs which, for the mounting of the armature, extend from the armature radially to the stator. With an increase of the flexural stiffness of the control diaphragm and/or of a stiffness of the armature in the longitudinal direction, however, a greater force is required to deflect the control diaphragm in its deflection direction.

In the case of known hydraulic mounts, it is a disadvantage that electromagnetic linear actuators often do not exhibit the required power and/or dynamics to switch the hydraulic mount with a particularly flexurally stiff control diaphragm and/or particularly flexurally stiff bearing springs to a "soft" state in the desired manner. Furthermore, it must be observed that only limited structural space is available for a linear actuator in a hydraulic mount. Thus, if it is identified that the force and/or the dynamics of a linear actuator are not sufficient and therefore a more powerful linear actuator would possibly be required, this normally cannot be implemented, because the available structural space is not sufficient when using known electromagnetic linear actuators.

The invention is therefore based on the object of providing a hydraulic mount which is particularly highly suitable for the damping of low-frequency vibrations and for the isolation of high-frequency vibrations. In particular, it is sought to be able to increase the inflation stiffness of the working chamber and to maintain the dynamics of the actuator or of the control diaphragm controlled by the actuator, without providing a greater electrical power of the actuator.

According to a first aspect, the object is achieved by way of a hydraulic mount, having a load-bearing spring, a working chamber which is at least partially enclosed by the load-bearing spring and which is filled with a hydraulic fluid, a control diaphragm which is designed for the variation of a working chamber volume of the working chamber, and an electromagnetic actuator for the deflection of the control diaphragm, wherein the actuator comprises a stator and an armature which is movable in the longitudinal direction of the stator, the armature is mechanically connected to the control diaphragm, the stator has a stator conductive element composed of ferromagnetic material, the stator conductive element has an upper stator collar extending in the transverse direction of the stator and has a lower stator collar extending in the transverse direction of the stator, the armature has an armature conductive element composed of ferromagnetic material, the armature conductive element has an upper armature collar extending in the transverse direction of the stator and has a lower armature collar extending in the transverse direction of the stator, the upper stator collar and the upper armature collar face toward one another, the lower stator collar and the lower armature collar face toward one another, the control diaphragm is designed, in its deflection direction, for a maximum deflection a, and the upper and/or lower collars which respectively face toward one another partially overlap, over an overlap length u, in the longitudinal direction of the stator, such that a ratio of overlap length u to maximum deflection a lies between 0.1 and 1.5. The stator collars preferably have in each case one stator pole surface at their ends facing toward the armature. This applies correspondingly to the armature. The armature collars preferably therefore have in each case one armature pole surface at their ends facing toward the stator. Where an overlap of the collars is referred to here and/or below, this relates at least preferably to the respectively associated pole surfaces of the stator and/or of the armature.

As already discussed above, the control diaphragm serves for the isolation of high-frequency vibrations. For this purpose, the control diaphragm is designed for the variation of a working chamber volume of the working chamber. The high-frequency vibrations normally have relatively small amplitudes. The maximum deflection of the control diaphragm and a corresponding variability of the working chamber volume of the working chamber may be configured correspondingly to said amplitudes. The maximum deflection is thus to be understood to mean the distance covered by the control diaphragm when it is deflected to its maximum extent from its rest position in which it is not deflected. From the rest position, the control diaphragm can be deflected in a positive deflection direction and in a negative deflection direction, such that, in the case of a symmetrical embodiment, the control diaphragm has a maximum stroke which corresponds to twice the maximum deflection.

The upper collars that face toward one another refer to the upper stator collar and the upper armature collar. The lower collars that face toward one another refer to the lower stator collar and the lower armature collar. To make the further explanation more concise, the effects and advantages of the upper collars and associated preferred refinements will be discussed below first, wherein analogous advantages, effects and preferred refinements however apply correspondingly to the lower collars.

The upper collars face toward one another and overlap in the longitudinal direction of the stator. Said overlap serves for concentrating and/or diverting a magnetic field, which preferably originates from an electrical coil of the stator and/or from a permanent magnet of the armature. It is known that the upper collars overlap as completely as possible in order to generate the least possible magnetic resistance in the corresponding transition region. Here, it must be taken into consideration that the armature and the stator are separated from one another by an air gap or by a suitable magnetic insulator. In the case of the hydraulic mount according to the invention, the known, complete overlap of the upper collars is departed from. It is the intention for the upper collars to overlap not completely but only partially. A corresponding situation applies to the lower collars, which likewise overlap not completely but only partially. In the rest state of the electromagnetic actuator, the upper collars and the lower collars respectively overlap in the longitudinal direction of the stator over an overlap length. Said rest state is however not a stable state, because, for the electromagnetic interaction between the collar of the armature or stator of the electromagnetic actuator, there are positions of the armature which are more expedient from an energy aspect. Under the provisional assumption that the armature is not subject to any mechanical resistance in the longitudinal direction, the armature would move in the longitudinal direction. According to the invention, however, the armature is mechanically connected to the control diaphragm. In order that the armature can perform the abovementioned movement, it would thus be necessary for the control diaphragm to be deflected. The deflection of the control diaphragm is subject to resistance, which can be attributed substantially to an elastic deformation of the control diaphragm and/or to associated connecting elements for connection to a wall, in particular to the partition, of the hydraulic mount. The armature will thus not be able to perform the full movement that would be possible if the armature were not subject to any mechanical resistance in the longitudinal direction.

It has been discussed above that it would be advantageous for the inflation stiffness of the working chamber to be increased. One possibility consists in increasing the stiffness of the control diaphragm, in particular of the connecting elements for connection to the adjacent wall. With the refinement of the hydraulic mount according to the invention, this is now possible. With an increase of the stiffness of the control diaphragm, the force required to deflect the control diaphragm duly also increases. The corresponding additional force is however applied by way of the partial overlap of said collars. Thus, in the event of a controlled deflection by way of an energization of a coil of the electromagnetic actuator, a superposition of the force generated as a result of the partial overlap of the collars and of the force generated by way of the supplied electrical power occurs. Thus, at least substantially no larger structural space is required for the actuator. Furthermore, the dynamics of the assembly composed of actuator and control diaphragm are maintained because, with the partial overlap of the collars according to the invention, an additional force is imparted.

To ensure that the control diaphragm is not deflected, or is only scarcely deflected, in a state in which the electromagnetic actuator is not energized, the ratio of maximum deflection of the control diaphragm to the overlap length of the collars amounts to 0.1 to 1.5. The ratio preferably amounts to 0.3 to 0.7. The ratio particularly preferably amounts to approximately 0.5. Said values for the ratio particularly advantageously reflect a compromise which firstly offers a sufficient force as a result of the partial overlap of the collars and secondly prevents the control diaphragm from being deflected to too great an extent when the coil of the electromagnetic actuator is not energized. Furthermore, with the stated ratios, the actuator can have imparted to it a linear or progressive transmission characteristic between a deflection travel of the armature and a corresponding force resulting from the partial overlap. In this way, the actuator can be controlled in a particularly effective manner.

An advantageous refinement of the hydraulic mount is characterized in that the upper armature collar projects beyond the upper stator collar in the longitudinal direction of the stator or vice versa. This refinement of the hydraulic mount is distinguished by its simple construction and thus inexpensive production. Furthermore, it is ensured in this way that at least one collar pair, specifically that of the upper collars of the armature and the stator, partially overlap. If only the upper collars partially overlap, it is also possible with this refinement for a preferred direction for the force originating from the partial overlap of the collars to be defined. In this case, the force would point in the direction of the control diaphragm or away from the control diaphragm. The preferred direction for said force may be selected in accordance with the type of construction of the hydraulic mount, for example with a conventional principle of the coupling of the control diaphragm or in accordance with the so-called inverted principle. The force direction is defined significantly by whether the upper armature collar projects in the longitudinal direction of the stator beyond the upper stator collar or whether the upper stator collar projects in the longitudinal direction of the stator beyond the upper armature collar.

A further advantageous refinement of the hydraulic mount is characterized in that the lower armature collar projects beyond the lower stator collar in the longitudinal direction of the stator or vice versa. With regard to the lower collar, reference is made to the effects and advantages of preferred refinements of the above-discussed refinement of the hydraulic mount. Specifically, analogous relationships apply to the lower collars. The projecting-beyond configuration preferably refers to a projecting-beyond configuration at an outer side. If a partial overlap is formed at the lower collars and at the upper collar, the abovementioned effects with regard to the preferred direction of the force can be superposed. Such a refinement is therefore particularly advantageous for making it possible for the control diaphragm to be deflected both in a positive longitudinal direction and in a negative longitudinal direction.

A further advantageous refinement of the hydraulic mount is characterized in that an armature collar spacing between the upper and the lower armature collar in the longitudinal direction of the stator is greater than a stator collar spacing between the upper and the lower stator collar in the longitudinal direction of the stator. The armature collar spacing and the stator collar spacing preferably refer to the spacing between their respective casing sides facing toward one another. By virtue of the armature collar spacing being greater than the stator collar spacing, it is ensured in a particularly simple manner that, during passive operation, when a coil of the actuator is not energized, complete overlapping of the collars which face toward one another does not occur.

A further advantageous refinement of the hydraulic mount is characterized in that an armature collar spacing between the upper and the lower armature collar in the longitudinal direction of the stator is smaller than a stator collar spacing between the upper and the lower stator collar in the longitudinal direction of the stator. With regard to the understanding of the armature collar spacing and of the stator collar spacing, the above refinement is referred to, to which refinement reference is thus made. By virtue of the armature collar spacing being selected to be smaller than the stator collar spacing, it is likewise ensured in a particularly simple manner that, during passive operation, complete overlapping at the upper collars and/or at the lower collars does not occur.

A further advantageous refinement of the hydraulic mount is characterized in that the collars which respectively face toward one another overlap by between 55% and 85% in the longitudinal direction of the stator. By virtue of the fact that the collars which face toward one another overlap by more than 50%, it can be ensured that, even in the event of a deflection of the control diaphragm as a result of a movement of the armature in the longitudinal direction of the stator, an at least small overlap of the collars which face toward one another is maintained, such that the magnetic field lines continue to be concentrated and/or diverted. This prevents the actuator from assuming an undesired state. In other words, the armature remains controllable in a particularly effective manner. With the maximum overlap of 85%, the desired partial overlap is ensured. This applies at least for passive operation, in the case of which a coil of the stator is not energized.

A further advantageous refinement of the hydraulic mount is characterized in that the overlap and the stiffness of the control diaphragm in the deflection direction are configured such that a passive force effected by the actuator as a result of the partial overlap of the collars which respectively face toward one another causes the control diaphragm to deflect by at most 10% of its maximum deflection a. As already discussed above, the partially overlapping collars give rise to a force on the armature in the longitudinal direction of the stator. Said force is also referred to as passive force. If the at least one coil of the actuator is not energized, the passive force acts directly on the control diaphragm owing to the connection between the armature and the control diaphragm, such that a deflection of the control diaphragm in its deflection direction occurs. To now prevent the control diaphragm from being deflected to too great an extent in this case, in the case of which the remaining stroke of said control diaphragm could become too small for acting on vibrations of the hydraulic mount, it is provided that said passive force deflects the control diaphragm by at most 10% of its maximum deflection. Thus, 90% of its maximum deflection remains, which can be utilized for the action on vibrations of the hydraulic mount.

A further advantageous refinement of the hydraulic mount is characterized in that the stator engages by way of its stator collar over at least one coil. By way of the coil, a coil magnetic field can be introduced into the stator conductive element, which stator magnetic field is suitable for the control of the armature.

A further advantageous refinement of the hydraulic mount is characterized in that the armature engages by way of its armature collar over at least one permanent magnet. By way of the permanent magnet, a permanent magnetic field can be introduced into the armature conductive element. The permanent magnetic field serves firstly for the constructive or destructive superposition of the coil magnetic field which is diverted and/or concentrated by the stator and the armature. Secondly, the permanent magnetic field serves for generating the passive force. This is because the permanent magnetic field, which is likewise concentrated and/or diverted by the stator conductive element and the armature conductive element, is subjected to a lower resistance if the armature is moved into a position which is more expedient from an energy aspect.

It is basically also possible for the two abovementioned refinements to be provided in a reversed combination. In that case, it would be possible for the armature to engage by way of its armature collar over at least one coil. It would be possible for the stator to engage by way of its stator collar over at least one permanent magnet. With this reversed combination, analogous advantages and effects are realized, such that reference is made analogously to the explanations above.

According to a further aspect, the object mentioned in the introduction is achieved by way of a motor vehicle which comprises a vehicle frame, an engine and an engine mount which produces a connection, with mounting action, between the engine and the vehicle frame, wherein the engine mount is formed by the hydraulic mount according to the invention, in particular according to one of the embodiments above. Here, features, details and advantages that have been described in conjunction with the hydraulic mount according to the invention self-evidently also apply in conjunction with the motor vehicle according to the invention and vice versa in each case, such that reference is always or can always be made reciprocally with respect to the disclosure of the individual aspects of the invention.

Figure 2:
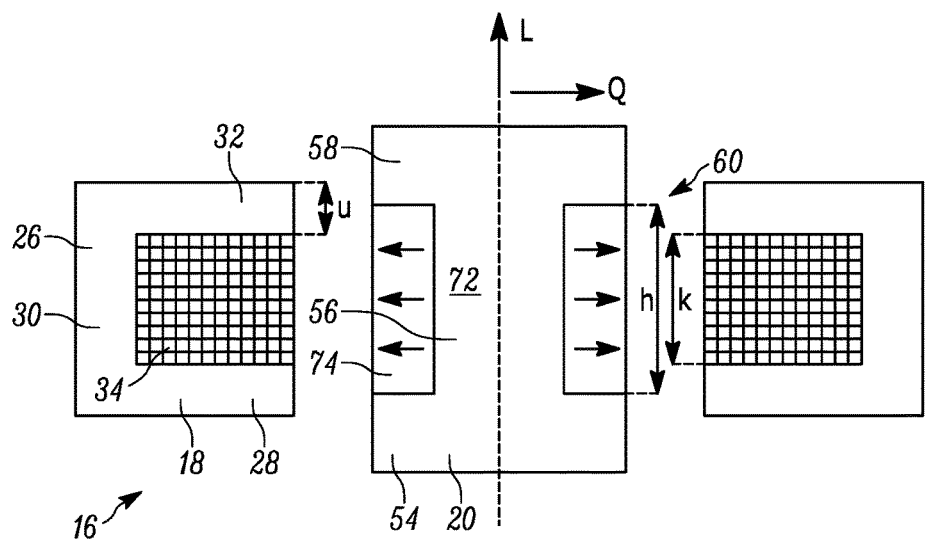

The invention will be described below, without restriction of the general concept of the invention, on the basis of exemplary embodiments and with reference to the drawings. In the drawings:

FIG. 1 shows the hydraulic mount in a schematic cross-sectional illustration, and FIG. 2 shows an enlarged detail of the actuator of the hydraulic mount from FIG. 1.

FIG. 1 shows a hydraulic mount 2. The hydraulic mount 2 comprises a load-bearing spring 36 in the form of a rubber element. Said load-bearing spring 36 is usually in the form of a hollow body, wherein the top side of the load-bearing spring 36 has a cover 38. A connection element (not illustrated) for the fastening of an engine is normally attached to the cover 38. In a simple embodiment, the connection element is a threaded bolt which can be screwed to the engine. The bottom side of the load-bearing spring 36 is adjoined by the partition 8. The working chamber 4 is formed between the load-bearing spring 36, the cover 38 and the partition 8. The working chamber 4 is filled with a hydraulic fluid. This is preferably a mixture of oil and water. Situated adjacently below the partition 8 in the longitudinal direction L is the hollow cylindrical base housing 40, the interior space of which is divided by a flexible separating body 48. The separating body 48 is also referred to as rolling diaphragm. The space enclosed by the partition 8, the separating body 48 and the base housing 40 forms the equalization chamber 6 of the hydraulic mount 2. The equalization chamber 6 is preferably likewise filled with hydraulic fluid. Said hydraulic fluid may likewise be a mixture of oil and water. It can thus be seen from FIG. 1 that the partition 8 is arranged between the working chamber 4 and the equalization chamber 6. For the damping of low-frequency vibrations which are exerted by the engine on the load-bearing spring 36 via the cover 38 and which thus also act on a working chamber volume 14 of the working chamber 4, a throttle duct 10 is provided which is formed between the working chamber 4 and the equalization chamber 6 and which serves for the exchange of hydraulic fluid. If the load-bearing spring 36 is compressed as a result of the low-frequency vibrations, this normally leads to an increase of the pressure of the hydraulic fluid in the working chamber 4 and/or to a decrease in size of the working chamber volume 14 of the working chamber 4. Here, in both alternatives, a volume flow of the hydraulic fluid takes place from the working chamber 4 through the throttle duct 10 into the equalization chamber 6. Here, dissipation occurs in the throttle duct 10, such that the low-frequency vibrations acting on the load-bearing spring 36 can be dampened. The damping by way of the throttle duct 10 is however effective only for low-frequency vibrations. In the presence of relatively high-frequency vibrations, for example above 20 Hz, virtually no damping of vibrations whatsoever is effected by way of the throttle duct 10.

For the isolation of vibrations with a frequency of greater than 20 Hz, the hydraulic mount 2 has a control diaphragm 12. Said control diaphragm 12 is assigned to the partition 8. For this purpose, the control diaphragm 12 may be formed by the partition 8 itself or may be inserted into the partition 8. It is thus possible for the partition 8 to enclose the control diaphragm 12. For the connection, the control diaphragm 12 is assigned fastening elements 70. The fastening elements are elastically deformable. By way of the fastening elements 70 thereof, the control diaphragm 12 is preferably fastened to the partition 8. Thus, the control diaphragm 12 is designed to be elastically deformable in the longitudinal direction L of the hydraulic mount 2. In accordance with the elastic deformability of the control diaphragm 12 in the longitudinal direction L, the working chamber volume 14 of the working chamber 4 increases or decreases in size.

The deformability of the control diaphragm 12 is utilized advantageously to isolate relatively high-frequency vibrations. For this purpose, the control diaphragm 12 is, at its side averted from the load-bearing spring 36, mechanically connected to an armature 20 of an electromagnetic linear actuator 16 of the hydraulic mount 2. The linear actuator 16 furthermore has a stator 18, with the armature 20 being arranged so as to be mounted movably with respect to said stator. The stator 18 is fastened to the base housing 40 of the hydraulic mount 2 or is at least partially formed by the base housing 40. To restrict the movement direction of the armature 20 to a movement direction in the longitudinal direction L, the linear actuator 16 has a corresponding bearing arrangement. It is thus possible for the elastic deformation of the control diaphragm 12 to be electrically controlled by way of the electromagnetic linear actuator 16.

Furthermore, FIG. 1 shows an advantageous embodiment of the hydraulic mount 2 according to the invention in which the armature 20 is mechanically connected to the control diaphragm 12 by way of a mechanical plunger 46 which is assigned to the armature 20. By way of the plunger 46, the stator 18 of the linear actuator 16 can be arranged so as to be spaced apart from the control diaphragm 12, such that the equalization chamber 6 can form in the region between the stator 18 and the partition 8. Such an embodiment of the hydraulic mount 2 has proven to be particularly expedient in practice. Other embodiments which do not have a plunger 46 or which, instead of the plunger 46, have some other articulated mechanism for the transmission of forces of the linear actuator 16 to the control diaphragm 12 are therefore likewise intended to be regarded as a mechanical connection between the armature 20 and the control diaphragm 12.

As can also be seen from FIG. 1, the armature plunger 46 of the armature 18 leads through the partition 8. For this purpose, the armature plunger 46 may be mounted on and/or sealed off against the partition 8. The control diaphragm 12 adjoins that end of the armature plunger 46 which is averted from the stator 18. The control diaphragm 12 is inserted into a pressure chamber housing 22, wherein a pressure chamber 52 is formed between the control diaphragm 12 and the pressure chamber housing 22. The control diaphragm 12 is thus arranged between the control duct 24 and the pressure chamber 52. The pressure chamber housing 22 may be formed by the partition 8. The pressure chamber 52 may be filled with dried air, gas and/or a gas mixture. With the deflection of the control diaphragm 12, it is thus the case that not only the volume of the working chamber 4 but also the volume of the pressure chamber 52 is varied. Such a construction is basically known from the prior art and is also referred to as an inverted construction.

Viewing FIGS. 1 and 2 together, a design variant of the electromechanical linear actuator 16 can be seen in which an associated stator 18 has at least one electrical coil 34. For the concentration of a coil magnetic field, the coil 34 is engaged over by a conductive element 26 composed of ferromagnetic material, wherein the upper stator collar 32 and lower stator collar 28 thereof point toward the armature 20. A stator longitudinal section 30 of the stator conductive element 26 extends between the upper stator collar 32 and the lower stator collar 28. The stator conductive element 26 is thus of C-shaped form and is thus suitable for engaging over the coil 34. To divert the coil magnetic field in as concentrated a manner as possible between the stator collars 32, 28, the armature conductive element 72 of the armature 20 is provided, wherein the upper armature collar 58 of the armature conductive element 72 and the lower armature collar 54 of the conductive element 72 point toward the stator 18. An armature longitudinal section 56 of the armature conductive element 72 extends between the upper armature collar 58 and the lower armature collar 54. The armature conductive element 72 is thus of C-shaped form and is thus suitable for engaging over a permanent magnet 74 of the armature 20. The armature 20 thus comprises at least one permanent magnet 74 which is engaged over by the C-shaped form of the armature conductive element 72. A permanent magnetic field originating from the at least one permanent magnet is concentrated and/or diverted by the armature conductive element 72. It is then possible for the permanent magnetic field to also be concentrated and/or diverted by way of the interaction of armature conductive element 72 and stator conductive element 26. In the transverse direction Q of the stator 18, the stator 18 and the armature 20 are spaced apart from one another by an air gap 60. If the electromagnetic actuator 16 has an at least substantially rotationally symmetrical construction, the air gap 60 is of ring-shaped form. It is thus possible for the stator 18 and the armature 20 to each have a cylindrical form.

To effect a deflection of the armature 20 in the longitudinal direction L, the coil 34 is energized. Here, the coil magnetic field is generated which is concentrated by the conductive elements 26, 72, such that circular magnetic field lines are generated. These also lead through the two collars 54, 58. Arranged adjacent to the collars 54, 58 is the permanent magnet 74, which has a magnetic field orientation in the transverse direction Q. Thus, in the event of an energization of the coil 34, the concentrated coil magnetic field has a permanent magnetic field of the permanent magnet 74 constructively superposed thereon in the lower collar 54, whereas the concentrated coil magnetic field has the permanent magnetic field of the permanent magnet 74 destructively superposed thereon in the upper collar 58, or vice versa. Depending on the configuration of said superposition, the armature 20 moves upward or downward in the longitudinal axial direction L.

To ensure that the armature 20 performs the desired movement only in the longitudinal direction L, it is known from the prior art for the armature 20 to be fastened at its top side by way of an upper guide spring 62, and at its bottom side by way of a lower guide spring 64, to the stator 18. The two guide springs 62, 64 prevent the armature 20 from being able to perform a movement in the transverse direction Q.

It can also be seen from FIGS. 1 and 2 that the upper collars 32, 58, which face toward one another, and the lower collars 28, 54, which face toward one another, partially overlap in each case in pairwise fashion. Said overlap is denoted in FIG. 2, for the upper collars 32, 58, by the overlap length u. In the longitudinal direction L, the upper collar 58 of the armature 20 projects beyond the upper collar 32 of the stator 18. Here, as is desired, a complete overlap between the two collars 32, 58 does not occur. Analogously to the upper collars 32, 58, the two lower collars 28, 54 likewise overlap only partially. Said partial overlap has the result that a permanent magnetic field originating from the permanent magnet 74 moves the armature 20 in the longitudinal direction L. Here, the movement in the longitudinal direction L takes place such that the armature 20 assumes a state which is more expedient from an energy aspect for the permanent magnetic field. Thus, the armature 20 is acted on by a force in the longitudinal direction L. FIGS. 1 and 2 show in each case a state such as arises without energization of the coil 34 and at a moment immediately thereafter. As a result of the movement, originating from the armature 20, in the longitudinal direction L or owing to the associated force in the longitudinal direction L, the control diaphragm 12 is deflected in its deflection direction. To isolate vibrations of the hydraulic mount 2, preferably high-frequency vibrations, the control diaphragm 12 can be deflected in its deflection direction by at most a distance a, also referred to as maximum deflection a. If the control diaphragm 12 is also deflectable in a negative deflection direction, this yields a stroke with a doubled maximum deflection 2a.

As already discussed in the introduction, it is advantageous if the control diaphragm 12 and/or the connecting elements 70 thereof have a high stiffness in order to ensure a high inflation stiffness of the working chamber 4. In order for a control diaphragm 12 of said type with increased stiffness to now be able to be deflected in controlled fashion with similar dynamics by way of the actuator 16, it is provided according to the invention that the upper and/or lower collars 32, 58 and/or 28, 54 respectively which face toward one another only partially overlap in the longitudinal direction L of the stator 18. With said overlap, the above-discussed force in the longitudinal direction L is then generated. If the coil 34 is then energized for active operation, the forces on the one hand originating from the partial overlap of the collars 32, 58 and/or 28, 54 and on the other hand generated as a result of the energization of the coil 34 are superposed. It is thus possible, with a construction of the actuator 16 remaining at least substantially the same and with a structural space of the actuator 16 remaining at least substantially the same, for the dynamics of the deflection of the control diaphragm 12 to be maintained, and furthermore for an increased inflation stiffness to be ensured.

In practice, it has proven to be particularly expedient if the upper and/or lower collars 32, 58 and/or 28, 54 respectively which respectively face toward one another partially overlap, over an overlap length u, in the longitudinal direction L of the stator 18, such that a ratio of overlap length u to maximum deflection a lies between 0.1 and 0.7. Here, a direct connection between the armature 20 and the control diaphragm 12 is assumed. A deflection of the armature 20 thus leads to a deflection of the control diaphragm 12 of equal magnitude in the deflection direction of the control diaphragm 12. If a mechanism with a transmission ratio between the deflection of the armature 20 and the deflection of the control diaphragm 12 is used, a corresponding transmission ratio must be taken into consideration for the ratio, and should thus be correspondingly incorporated. With the abovementioned ratio of 0.1 to 0.7, it is advantageously achieved that the force, originating from the partial overlap, of the armature 20 behaves linearly or progressively with respect to the deflection of the armature 20. In an initial state, in which the coil 34 is not energized, it is then the case that only a very low force acts on the control diaphragm 12 with its increased stiffness, such that initially scarcely any variation in the deflection of the control diaphragm 12 in relation to the known construction of the hydraulic mount 2 is noticeable. If the coil 34 is energized for the isolation of high-frequency vibrations, a relatively large deflection of the armature 20 occurs, such that, for example, a progressive increase of the force originating from the partial overlap of the collars 32, 58 and 28, 54 respectively makes an increased contribution to the deflection of the control diaphragm 12. The required remaining force for the deflection of the armature 20 or of the control diaphragm 12 is thus underproportionally increased, such that the electrical power consumption of the actuator 16 increases only very slightly.

It has furthermore proven to be advantageous if the armature collar spacing h between the upper and the lower armature collar 58, 54 in the longitudinal direction L of the stator 18 is greater than a stator collar spacing k between the upper and the lower stator collar 32, 28 in the longitudinal direction L of the stator 18. It is thus possible, for example, for the armature collar spacing h to be selected to be greater than the sum of the stator collar spacing k and twice the maximum deflection a of the control diaphragm 12. This ensures, even in the case of a maximum deflection of the control diaphragm 12, that a complete overlap between the collars 32, 58 and 28, 54 respectively which face toward one another does not occur. Then, an only partial overlap of said collars 32, 58 and/or 28, 54 respectively remains even in the event of a relatively large deflection of the control diaphragm 12. In order to make the partial overlap even smaller and ensure the corresponding force on the armature 20 even in the event of a full deflection of the control diaphragm 12, the armature collar spacing h is selected to be considerably greater than the abovementioned sum. It is therefore preferable if the upper and/or lower collars 32, 58 and/or 28, 54 respectively which respectively face toward one another partially overlap, over an overlap length u, in the longitudinal direction L of the stator 18, such that a ratio of overlap length u to maximum deflection a lies between 0.1 and 1.5.

LIST OF REFERENCE SIGNS

Part of the Description a Maximum deflection
h Armature collar spacing
k Stator collar spacing
u Overlap length
L Longitudinal direction
Q Transverse direction
2 Hydraulic mount
4 Working chamber
6 Equalization chamber
8 Partition
10 Throttle duct
12 Control diaphragm
14 Working chamber volume
16 Actuator
18 Stator
20 Armature
22 Pressure chamber housing
24 Control duct
26 Stator conductive element
28 Lower stator collar
30 Stator longitudinal section
32 Upper stator collar
34 Coil
36 Load-bearing spring
38 Cover
40 Base housing
46 Plunger
48 Separating body
50 Stator housing
52 Pressure chamber
54 Lower armature collar
56 Armature longitudinal section
58 Upper armature collar
60 Air gap
62 Upper guide spring
64 Lower guide spring
70 Fastening element
72 Armature conductive element
74 Permanent magnet

The invention claimed is:

1. A hydraulic mount comprising:
a load-bearing spring;
a working chamber which is at least partially enclosed by the load-bearing spring and which is filled with a hydraulic fluid;
a control diaphragm which is designed for the variation of a working chamber volume of the working chamber; and,
an electromagnetic actuator for the deflection of the control diaphragm;
wherein the electromagnetic actuator comprises a stator and an armature movable in the longitudinal direction (L) of the stator;
wherein the armature is mechanically connected to the control diaphragm, and the armature comprises an armature conductive element composed of ferromagnetic material, and the armature conductive element comprises an upper armature collar extending in a transverse direction (Q) of the stator, and the armature conductive element comprises a lower armature collar extending in the transverse direction (Q) of the stator;
wherein the stator comprises a stator conductive element composed of ferromagnetic material, and the stator conductive element comprises an upper stator collar extending in the transverse direction (Q) of the stator, and the stator conductive element comprises a lower stator collar extending in the transverse direction (Q) of the stator;
wherein the upper stator collar and the upper armature collar face toward one another, and the lower stator collar and the lower armature collar face toward one another;
wherein the control diaphragm is designed, in a deflection direction, for a maximum deflection (a);
wherein the upper and lower collars which respectively face toward one another partially overlap, over an overlap length (u), in a longitudinal direction (L) of the stator, such that a ratio of overlap length (u) to maximum deflection a is between 0.1 and 1.5; and,
wherein the upper and lower collars which respectively face toward one another overlap by between 55% and 85% in the longitudinal direction (L) of the stator.

2. The hydraulic mount as claimed in claim 1, wherein the upper armature collar projects beyond the upper stator collar in the longitudinal direction (L) of the stator.

3. The hydraulic mount as claimed in claim 1, wherein the upper stator collar projects beyond the upper armature collar in the longitudinal direction (L) of the stator.

4. The hydraulic mount as claimed in claim 1, wherein the lower armature collar projects beyond the lower stator collar in the longitudinal direction (L) of the stator.

5. The hydraulic mount as claimed in claim 1, wherein the lower stator collar projects beyond the lower armature collar in the longitudinal direction (L) of the stator.

6. The hydraulic mount as claimed in claim 1, wherein an armature collar spacing (h) between the upper and the lower armature collar in the longitudinal direction (L) of the stator is greater than a stator collar spacing (k) between the upper and the lower stator collar in the longitudinal direction (L) of the stator.

7. The hydraulic mount as claimed in claim 1, wherein an armature collar spacing (h) between the upper and the lower armature collar in the longitudinal direction (L) of the stator is smaller than a stator collar spacing (k) between the upper and the lower stator collar in the longitudinal direction (L) of the stator.

8. The hydraulic mount as claimed in claim 1, wherein the overlap and the stiffness of the control diaphragm in the deflection direction are configured such that a passive force effected by the actuator as a result of the partial overlap of the collars which respectively face toward one another causes the control diaphragm to deflect by at most 10% of its maximum deflection (a).

9. The hydraulic mount as claimed in claim 1, wherein the stator engages by way of the upper stator collar and the lower stator collar over at least one coil.

10. The hydraulic mount as claimed in claim 1, wherein that the armature engages by way the upper armature collar and the lower armature collar over at least one permanent magnet.

11. The hydraulic mount as claimed in claim 1, wherein the hydraulic mount is comprised in motor vehicle comprising a vehicle frame, an engine and an engine mount which produces a connection, with mounting action, between the engine and the vehicle frame, and wherein the engine mount is formed by the hydraulic mount.

* * * * *